US008896924B2

(12) United States Patent
Weaver (10) Patent No.: US 8,896,924 B2
(45) Date of Patent: Nov. 25, 2014

(54) TUBULAR DAYLIGHTING SYSTEM (71) Applicant: Scott Weaver, Rancho Cordova, CA (US)

(72) Inventor: Scott Weaver, Rancho Cordova, CA (US)

(73) Assignee: ABL IP Holding, LLC, Conyers, GA (US)

(*) Notice: Subject to any disclaimer, the term of this patent is extended or adjusted under 35 U.S.C. 154(b) by 0 days.

(21) Appl. No.: 13/887,240

(22) Filed: May 3, 2013

(65) Prior Publication Data
US 2013/0314795 A1 Nov. 28, 2013

Related U.S. Application Data (60) Provisional application No. 61/643,171, filed on May 4, 2012.

(51) Int. Cl.
G02B 17/00 (2006.01)
G02B 19/00 (2006.01)
F21S 11/00 (2006.01)
E04D 13/03 (2006.01)

(52) U.S. Cl.
CPC ........ G02B 19/0042 (2013.01); G02B 19/0028 (2013.01); F21S 11/00 (2013.01); E04D 2013/034 (2013.01)
USPC ............................................. 359/591; 52/200

(58) Field of Classification Search
CPC .................. E04D 2013/0345; E04D 2013/034
USPC ............................. 359/591, 592, 597; 52/200
See application file for complete search history.

(56) References Cited

U.S. PATENT DOCUMENTS

| 270,132 | A | * | 1/1883 | Ross | 359/591 |
| 1,254,520 | A | * | 1/1918 | Macduff | 359/597 |
| 2,858,734 | A | | 11/1958 | Boyd | |
| 2,918,023 | A | * | 12/1959 | Bettcher | 52/22 |
| 4,615,579 | A | * | 10/1986 | Whitehead | 385/133 |
| 4,761,716 | A | | 8/1988 | Mori | |
| 5,099,622 | A | | 3/1992 | Sutton | |
| 5,175,967 | A | | 1/1993 | Greenwood | |
| 5,655,339 | A | | 8/1997 | DeBlock et al. | |
| 6,035,593 | A | | 3/2000 | Chao et al. | |
| 6,321,493 | B1 | | 11/2001 | Rillie et al. | |
| 6,363,668 | B2 | | 4/2002 | Rillie et al. | |
| 6,412,238 | B2 | | 7/2002 | Rillie et al. | |
| 6,415,563 | B2 | | 7/2002 | Rillie et al. | |
| 6,438,803 | B2 | * | 8/2002 | Rillie et al. | 24/279 |

(Continued)

FOREIGN PATENT DOCUMENTS

EP 2019887 11/2007

*Primary Examiner* — Christ Mahoney
(74) *Attorney, Agent, or Firm* — Brian Beverly; Beeson Skinner Beverly LLP (57) ABSTRACT An improved tubular daylighting system comprises a plurality of tubular shaft sections connected to a skylight lens for transmitting light through the shaft sections to the interior of a building. Adjoining top and bottom shaft sections have different diameters to enable one to be inserted into the other, the top shaft section having a plurality of tabs, the bottom section having a plurality of slots which register with the tabs of the top shaft section, such that selectively bending the tabs outwardly or inwardly from the shaft wall of the top shaft section through the slots of the bottom shaft section interconnects the top and bottom shaft sections in coaxial alignment. In one embodiment an inverted dome diffuser is mounted below the skylight lens atop the shaft sections to diffuse light entering the shaft sections.

14 Claims, 10 Drawing Sheets

(56) References Cited

U.S. PATENT DOCUMENTS

| | | |
|---|---|---|
| 6,918,216 B2 * | 7/2005 | Hoy et al. .................. 52/200 |
| 7,146,768 B2 | 12/2006 | Rillie |
| 7,185,464 B2 * | 3/2007 | Bracale .................. 52/200 |
| 7,546,709 B2 | 6/2009 | Jaster et al. |
| 7,621,081 B2 | 11/2009 | Rillie |
| 7,954,281 B2 | 6/2011 | Jaster |
| 8,018,653 B2 | 9/2011 | Jaster |
| 8,082,705 B2 | 12/2011 | Jaster et al. |
| 8,098,433 B2 | 1/2012 | Rillie et al. |
| 8,132,375 B2 | 3/2012 | Jaster |
| 2005/0166490 A1 * | 8/2005 | Darmer et al. .................. 52/200 |
| 2007/0266652 A1 | 11/2007 | Jaster et al. |
| 2009/0113824 A1 | 5/2009 | Rillie |
| 2010/0067114 A1 * | 3/2010 | Kinney et al. .................. 359/592 |
| 2010/0309556 A1 | 12/2010 | Jaster |
| 2013/0231535 A1 * | 9/2013 | Perry .................. 600/115 |

* cited by examiner

*FIG. 11H*

TUBULAR DAYLIGHTING SYSTEM

CROSS-REFERENCE TO RELATED APPLICATIONS

This application claims benefit of U.S. Provisional Application No. 61/643,171, filed May 4, 2012.

BACKGROUND OF THE INVENTION

The present invention generally relates to a skylight system for bringing natural daylight into buildings and more particularly to tubular skylights, sometimes referred to as "tubular daylighting devices," which use a light tube or pipe for transmitting daylight captured by a skylight on a roof structure down to another region of the building where it is emitted, such as through a false ceiling, into a living space within the building.

Tubular skylight devices are well known and have long been used for bringing daylight down into the interior of buildings having false ceilings. One common problem is that other equipment may create an obstruction in the ceiling space between the roof and ceiling that prevents connecting the light-gathering skylight to a light-emitting panel in a false ceiling using a straight shaft. Under such conditions, a shaft having one or more bends may be constructed from several straight and angle shaft sections in order to avoid the obstruction. Connecting the several sections of the shaft can be cumbersome and require tooling, and the resultant interconnected sections can often wind up being joined at an undesirable angle causing light loss between the skylight and ceiling panel.

A related problem associated with skylight shafts having one or more bends is light loss. The typical skylight lens sends collimated light into the skylight shaft. As the number of angles in the shaft increases, the percentage of light that reaches the ceiling panel decreases. Therefore, light shaft sections that are intended to be connected in linear alignment, but are instead bent, contribute to light loss.

Another problem caused by skylight shafts having bends is that the light falling on the ceiling panels can be uneven and create undesirable regions of contrasting light and dark brightness such as bright spots and shaded regions.

An additional problem in prior art skylight systems is that the lower lens assembly may be comprised of a number of pieces which may be difficult to disassemble to gain access to the lens for cleaning, cumbersome to handle, and challenging to obtain a tight seal.

BRIEF DESCRIPTION OF THE ILLUSTRATIONS

DETAILED DESCRIPTION OF THE ILLUSTRATED EMBODIMENT

Figure 1:
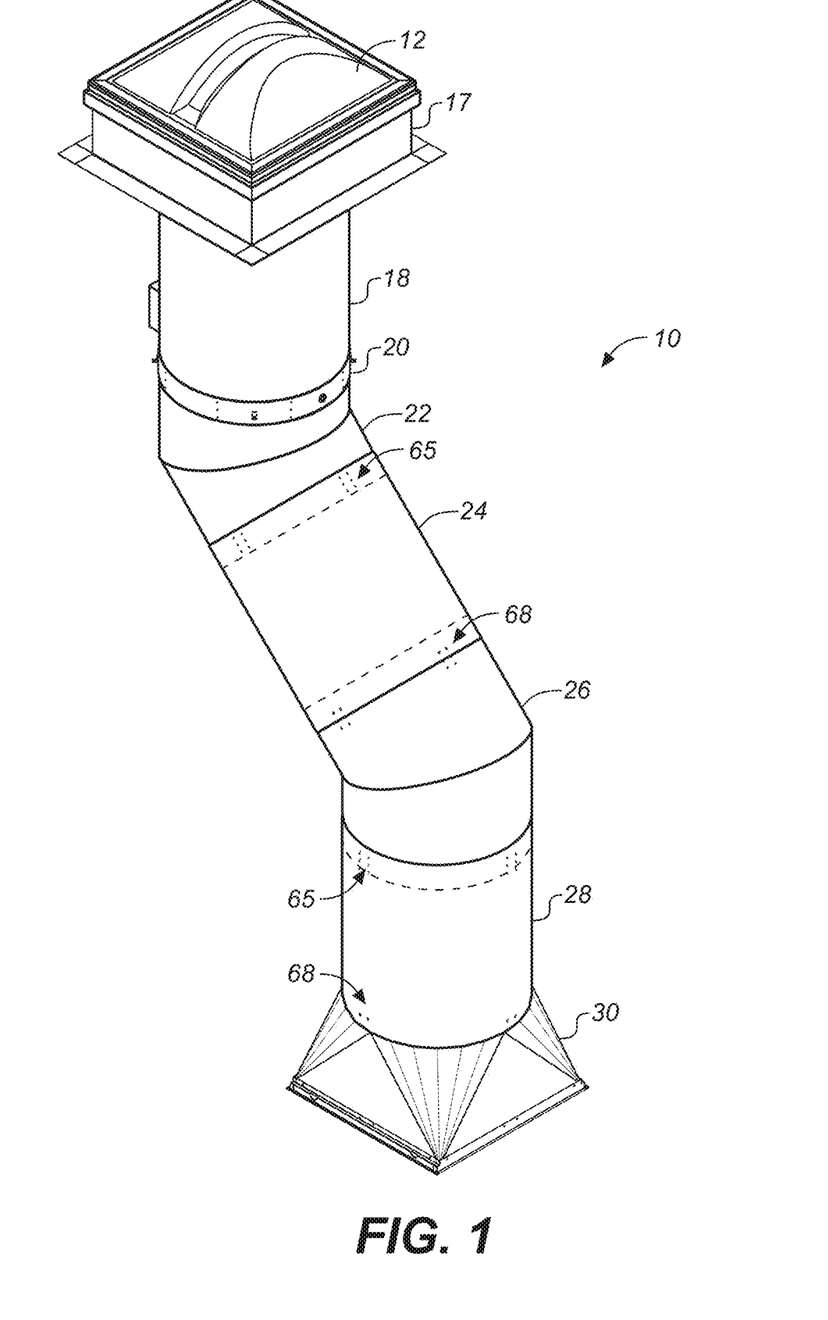
FIG. 1 is an upper perspective view of an improved tubular daylighting system according to the invention.
Figure 2:
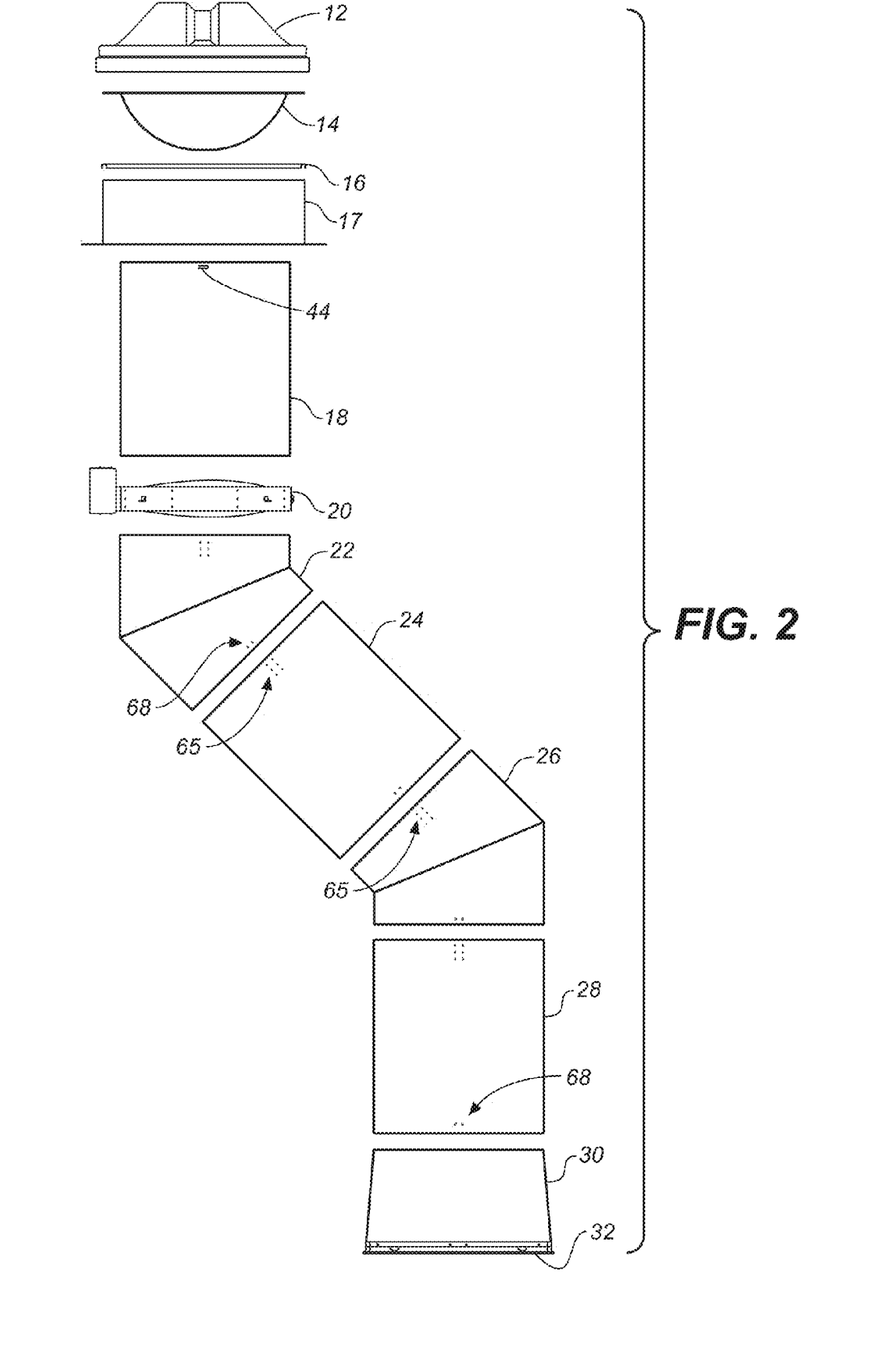
FIG. 2 is an exploded side elevation system of the improved tubular daylighting system shown in FIG. 1.
Figure 2A:
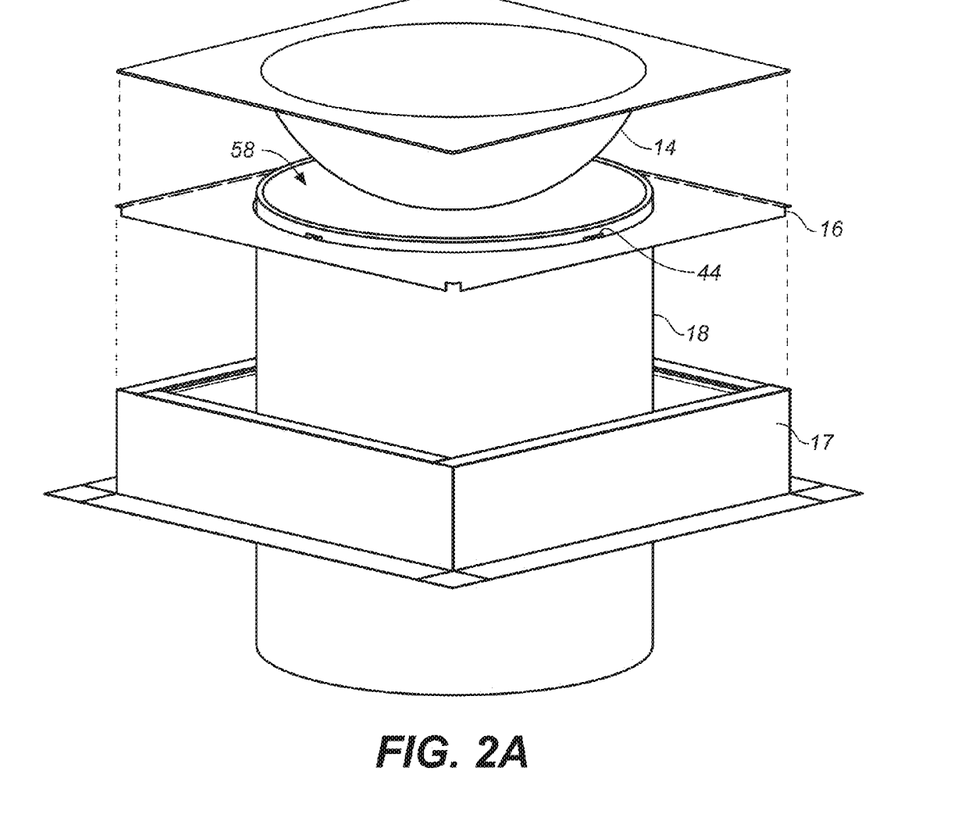
FIG. 2A is a perspective view of the diffuser, transition plate, square curb piece and upper shaft section of the improved tubular daylighting system shown in FIGS. 1 and 2.
Figures 3, 4:
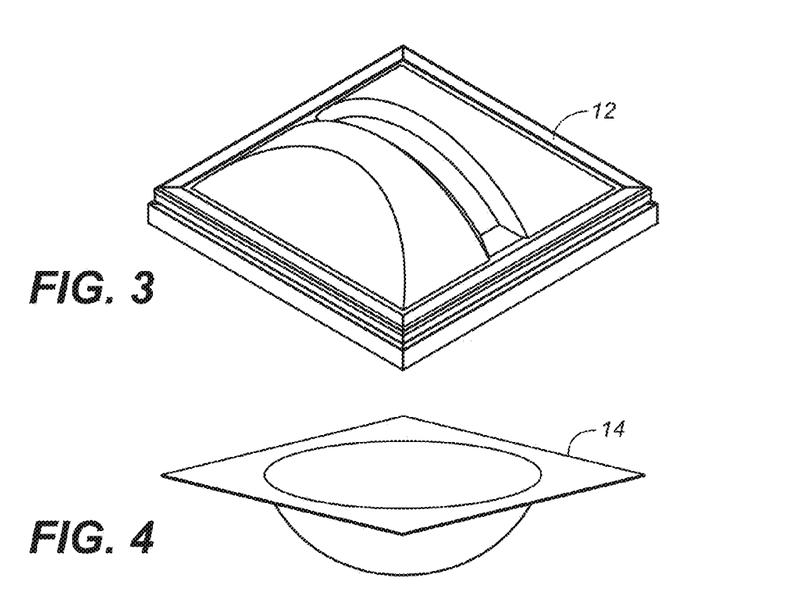
FIG. 3 is an upper perspective view of a skylight of the improved tubular daylighting system shown in FIG. 1.
FIG. 4 is an upper perspective view of a optic sphere thereof.
Figure 5:
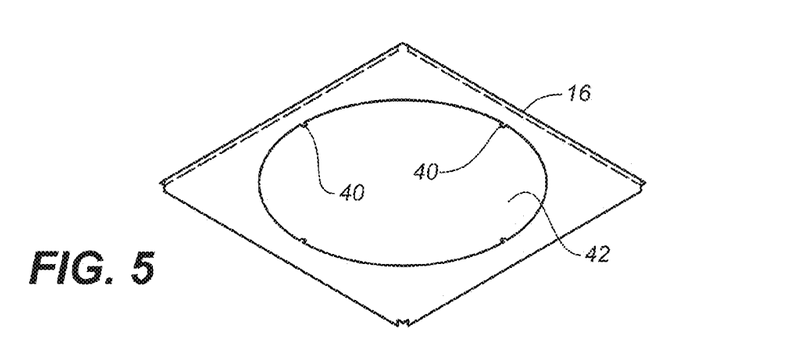
FIG. 5 is an upper perspective view of a square-to-round transition plate thereof.
Figure 6:
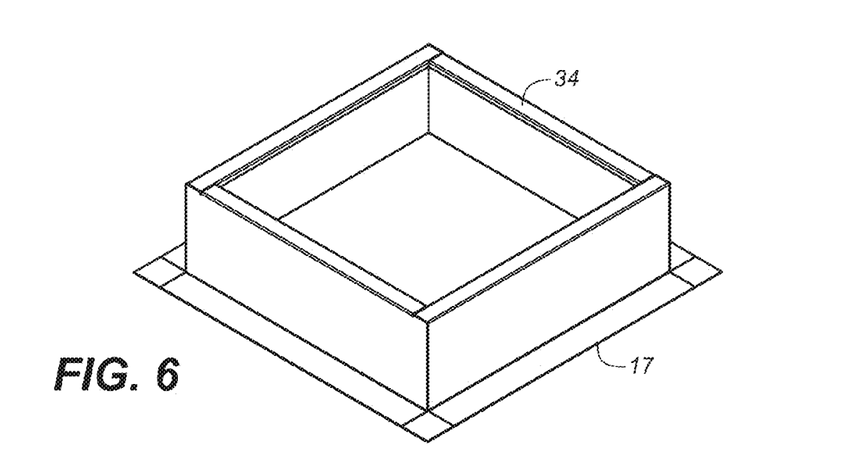
FIG. 6 is an upper perspective view of a square curb piece thereof.

An improved tubular daylighting system is generally indicated at 10 in FIG. 1. With reference to FIGS. 1 and 2, in one embodiment an improved tubular daylighting system comprises a skylight lens 12, diffuser 14, square-to-round transition plate 16, square curb piece 17, upper straight tubular shaft section 18, light damper 20, upper angled tubular shaft section 22, middle straight tubular shaft section 24, lower angled tubular shaft section 26, lower straight tubular shaft section 28, round-to-square transition piece 30, and hinging troffer bracket 32. The improved tubular daylighting system 10 takes light gathered by the skylight 12 and transmits it through the system to a ceiling diffuser secured to the ceiling using the hinging troffer bracket 32. Each of the tubular shaft sections 18, 22, 24, 26, 28 has reflective interior surfaces.

With additional reference now to FIGS. 2A and 3-6, the square curb piece 17 is incorporated into the roof structure and the square-to-round transition plate 16 is mounted on the top side 34 thereof. Upper straight shaft section 18 is suspended from transition plate 16 by inserting inwardly extending tabs 40 provided in circular aperture 42 into slots 44 provided in the upper edge of shaft section 18.

Figure 9:
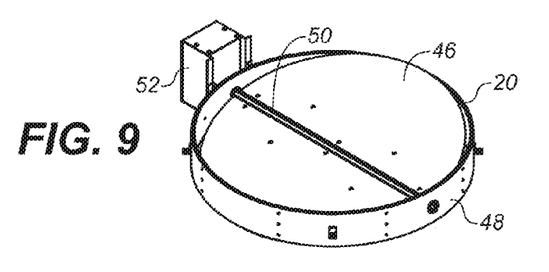
FIG. 9 is an upper perspective view of a light damper thereof.

Light damper 20 is then attached to the bottom edge of shaft section 18 using threaded fasteners. As shown in FIG. 9, light damper 20 comprises circular light blocking plate 46 rotatably attached to the inside of circular wall 48 via pivot pin 50. Pivot pin 50 extends from and may be controlled by motor 52. Thus, the orientation of plate 46 within wall 48 can be controlled by rotation of pivot pin 50. In one aspect of the invention, motor 52 may be remotely controlled. Plate 50 can be rotated to a horizontal disposition in which it blocks light entering the skylight 12 from being transmitted below light damper 20. If plate 50 is oriented to a vertical position, virtually all the light collected by the skylight 12 is transmitted below light damper 20.

Figures 7, 8:
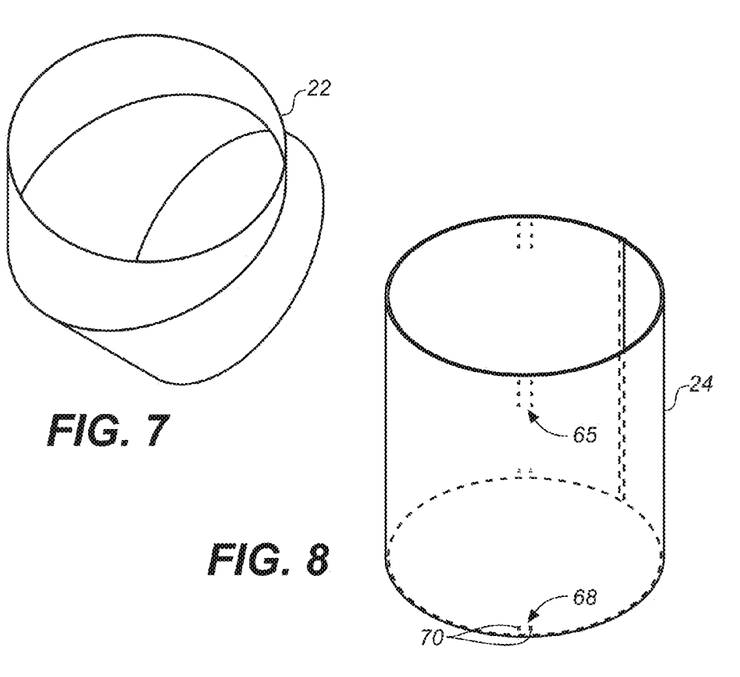
FIG. 7 is an upper perspective view of a tube angle piece thereof.
FIG. 8 is an upper perspective view of a straight tube section thereof.

An enlarged perspective view of the upper angled shaft section 22 is shown in FIG. 7. Upper angled shaft section 22 is suspended from light damper 20 with threaded fasteners thereby providing an upper bend in the system.

Figure 11:
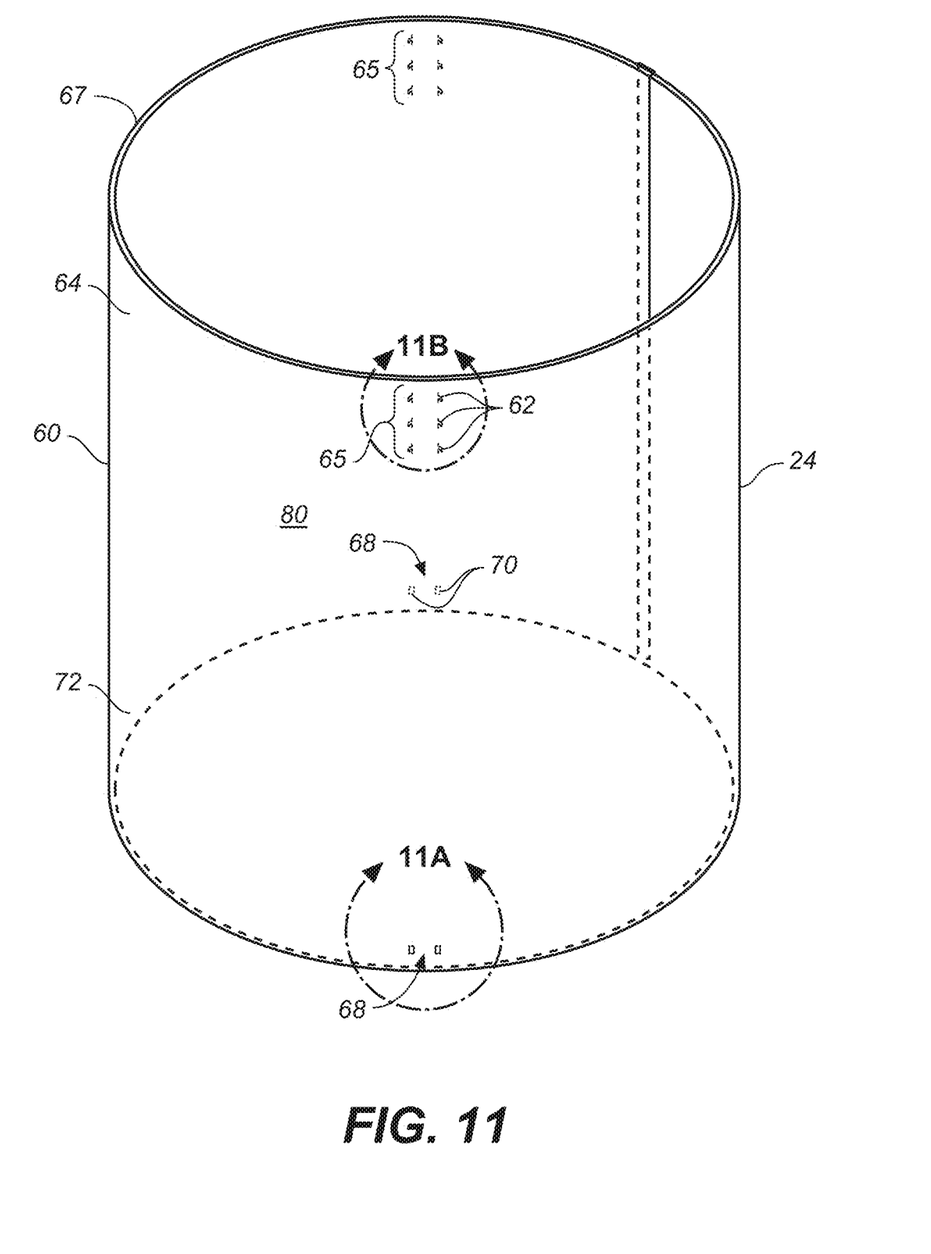
FIG. 11 is an enlarged perspective view of the straight tube section shown in FIG. 8 showing the tabs and slots which form an interconnection system for joining sections of the shaft.
Figure 11A:
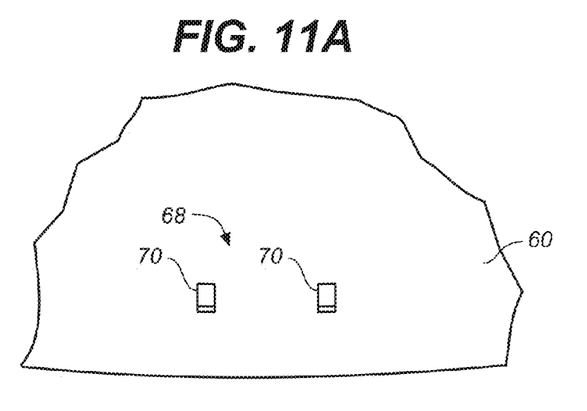
FIGS. 11A and 11B are enlarged cutaway perspective views of the tabs and slots, respectively, of the interconnection system shown in FIG. 11.
Figure 11B:
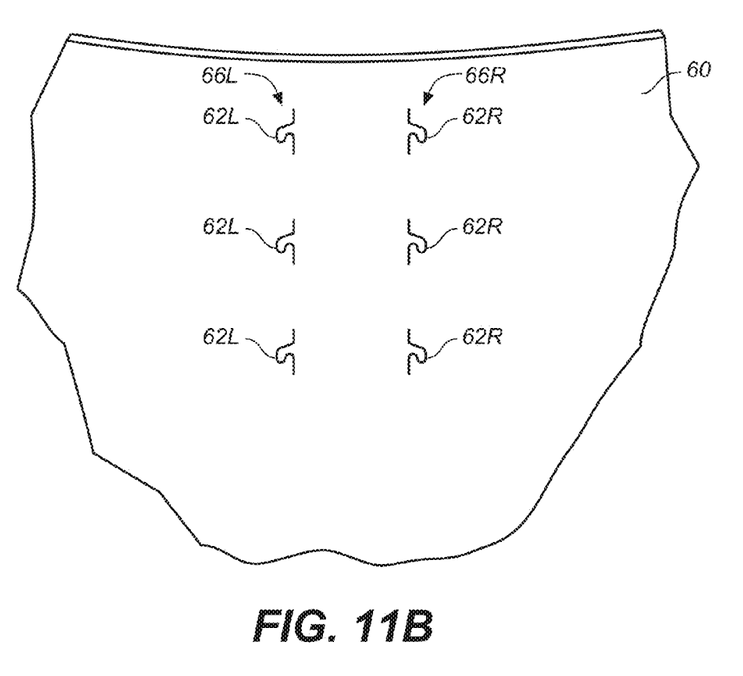

The middle straight shaft section 24, shown in FIG. 8, is attached to and depends from the upper angled shaft section 22 using an improved tab and slot interconnection system which is now described with reference to FIGS. 11 to 11C. A representative straight tubular shaft section 60 is shown in FIG. 11. A plurality of tabs 62 are formed in the top end 64 of shaft section 60 as shown in FIGS. 11 and 11A. The tabs may be laser cut or stamped into the shaft wall. In the illustrated embodiment, a plurality of tabs 62 is provided in an array 65 of two columns and three rows. In a left column 66L the tabs 62L are oriented to the left and in a right column 66R the tabs 62R are oriented to the right as shown in FIG. 11A. It will be understood by those of skill in the art that the number of rows and columns of tabs 62 need not be precisely be the same as shown in the drawing figures, but that there must be a sufficient distribution of tabs 62 around the circumference of the top end 64 of the shaft section 60 to engage with the slots as described below. A plurality of arrays 65 of tabs 62 are circumferentially distributed around the top end 64 of the shaft section 60. In the illustrated embodiment two arrays 65 are provided in diametrically opposed disposition. However, it will be appreciated that three, four, or more arrays may be provided, most advantageously in a symmetrically spaced distribution around the circumference of the top end 64 of the shaft section 60. Finally, all the tabs 62 in any selected row of tabs in all the arrays 65 of tabs distributed around the top end 64 of the shaft section 60 are disposed in a plane that is perpendicular to the central axis of the shaft section. The rows of tabs are spaced from the shaft section's top edge 67 in regularly spaced increments to facilitate precise fitting together of adjoining shaft sections. In one embodiment, the rows of tabs are spaced from the top edge 67 of the shaft section in one inch increments.

With continuing reference to FIG. 11, a plurality of sets 68 of slots 70 are provided on the bottom end 72 of the shaft section 60. Each set 68 of slots 70 is angularly aligned with one of the arrays 65 of tabs 62 such that each slot 70 of a top shaft section registers with one of the tabs 62 of a bottom shaft section of two sections that are being interconnected as discussed in greater detail below. With additional reference to FIG. 11C, each tab 62 is joined to the shaft section 60 at a bend line 78 about which the tab 62 can be bent inward or outward away from the shaft wall 80. Each tab 62 has a neck 74 at the end of which is formed a hook-like depending protrusion 76 thereby defining a recessed seating edge 82 between the protrusion 76 and the shaft body 80.

The shaft sections are provided in two alternating diameters, one diameter being slightly smaller than the other so that one section with a smaller diameter will fit snugly within an adjoining section having a larger diameter in a nesting configuration. The top ends of both the smaller and larger diameter sections have the tabs 62 described above, and the bottom ends of both the smaller and larger diameter sections have the slots 70 described above. Thus, adjoining shaft sections may fit into each other by alternating small and large diameter shaft sections.

Figure 11C:
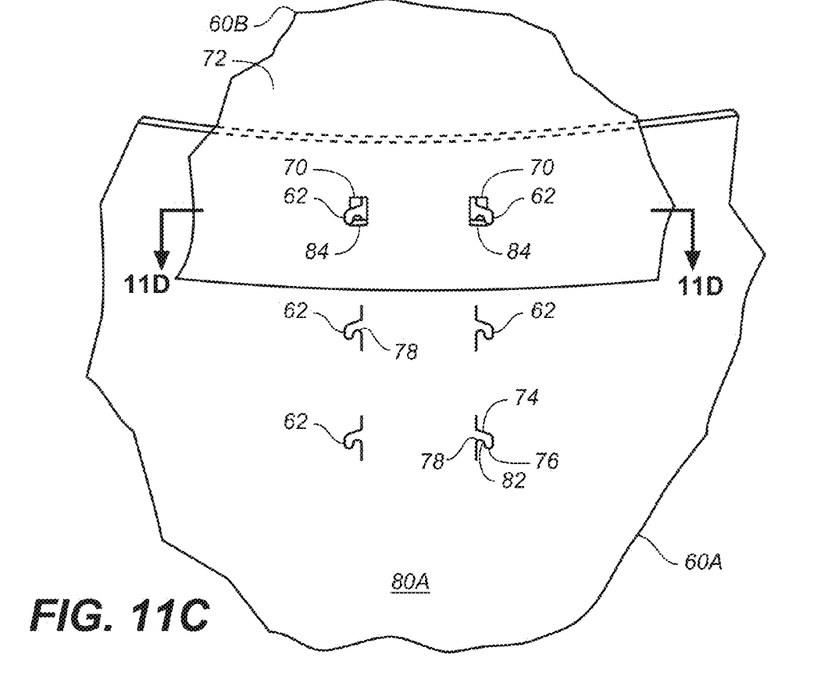
FIG. 11C is a cutaway enlarged perspective view of two shaft sections interconnected with a slot and tab interconnection system.
Figure 11D:
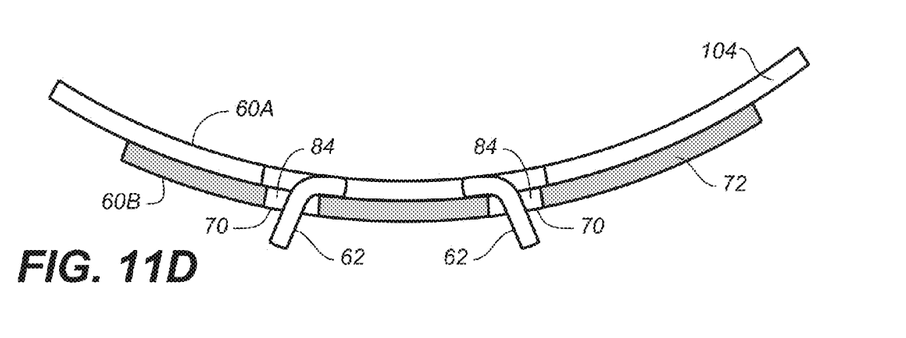
FIG. 11D is a sectional view of the two interconnected shaft sections shown in FIG. 11C taken along lines 11D-11D.
Figure 11E:
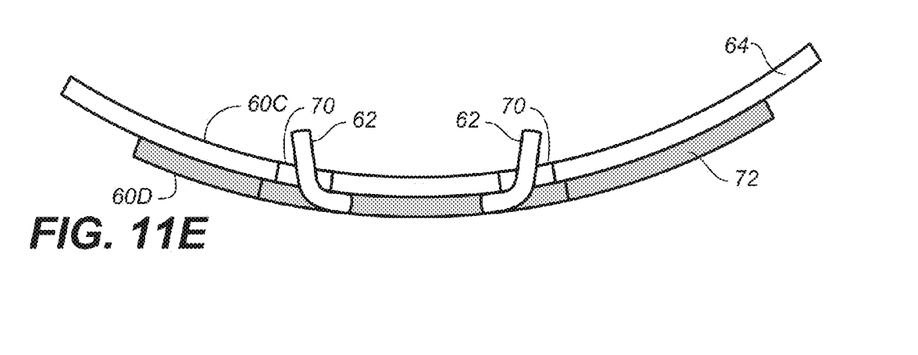
FIG. 11E is a sectional view of the two interconnected shaft sections shown in FIG. 11D but showing the tabs turned inward instead of outward.
Figure 11F:
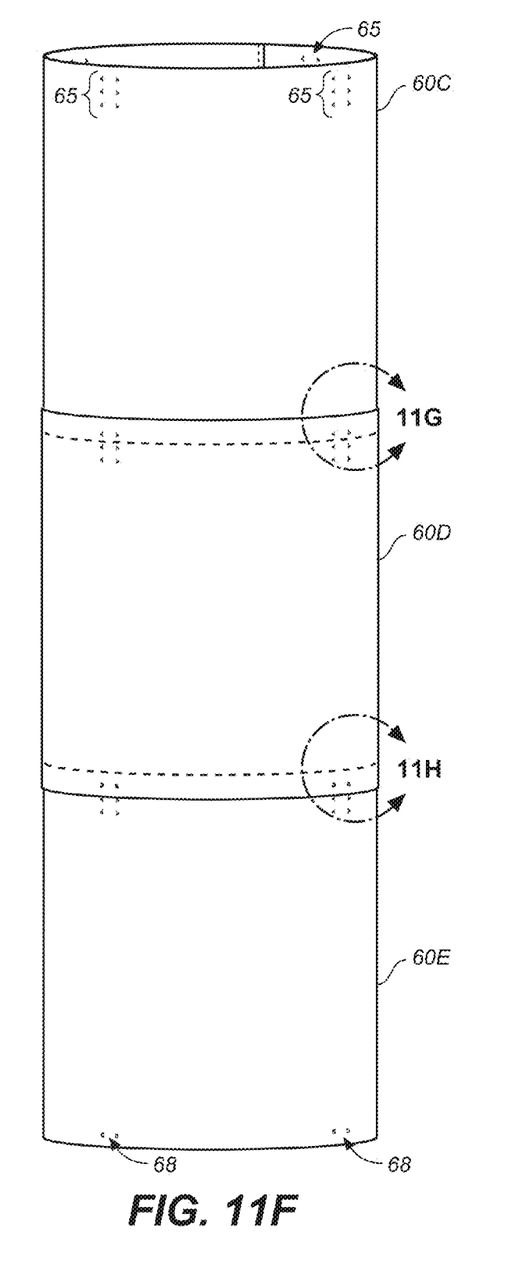
FIG. 11F is an upper perspective view of three interconnected tubular shaft sections.

In FIG. 11C bottom shaft section 60A is shown as having a smaller diameter than top shaft section 60B such that bottom shaft section 60A fits inside top shaft section 60B. Shaft sections 60A and 60B are interconnected by positioning them so that the slots 70 in the bottom end of the top shaft section 60B overlap the tabs 62 located in the top end of the bottom shaft section 60A and then bending the tabs 62 outward through the slots 70 as shown in FIGS. 11C and 11D. Thence any downward movement of the bottom shaft section 60B relative to the top shaft section 60A will result in the recess 82 of each tab 62 coming to rest on lower edge 84 of each slot 70. This not only creates a secure connection between the shaft sections 60A, 60B, but since the tabs 62 in each row of each array 65 of tabs around the bottom shaft section 60A are disposed perpendicularly to the central axis of the shaft section, by interconnecting the tabs 62 of the bottom shaft section 60A with the plurality of slots 70 of the top shaft section 60B the adjoined shaft sections will be automatically interconnected in coaxial alignment as shown in FIG. 11F. This is an advantage to the installer because the need to align the adjacent shaft sections manually and hold them in the correct alignment while connecting them using more conventional means, e.g., threaded fasteners, is eliminated.

Figure 11G:
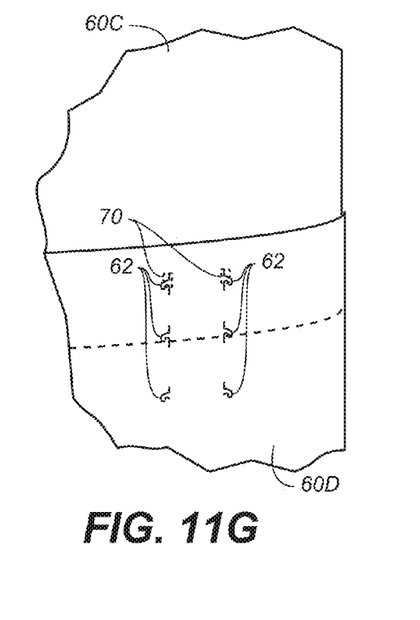
FIG. 11G is a cutaway enlarged perspective view showing the top and middle shaft sections seen in FIG. 11F joined using the tab and slot interconnection system.
Figure 11H:
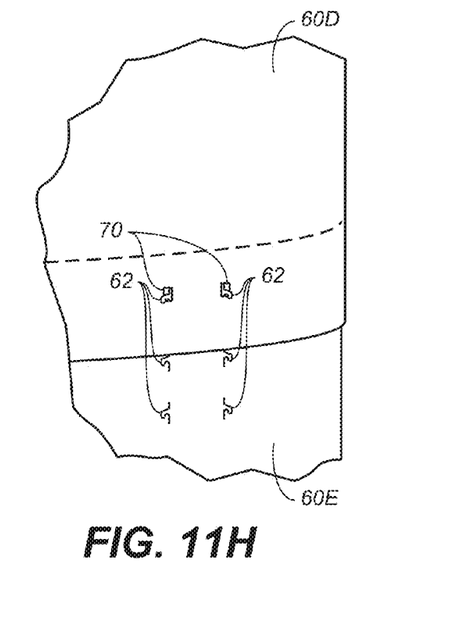
FIG. 11H is a cutaway enlarged perspective view showing the middle and bottom shaft sections seen in FIG. 11F joined using the tab and slot interconnection system.

FIG. 11F shows three interconnected shaft sections, top shaft section 60C, middle shaft section 60D, and bottom shaft section 60E, wherein middle shaft section 60D has a larger diameter than either of top and bottom shaft sections 60C, 60E (top shaft section 60C having the same diameter as bottom shaft section 60E). Middle and bottom shaft sections 60D, 60E are interconnected in the same way as discussed above in connection with shaft sections 60A and 60B. Top and middle shaft sections 60C and 60D are interconnected by inserting top shaft section 60C into middle shaft section 60D and then positioning the shaft sections so that the tabs 62 of middle shaft section 60D overlap and register with the slots 70 of top shaft section 60C and then bending the tabs 62 of the middle shaft section 60D inward through the slots 70 of the top shaft section 60C, as shown in FIGS. 11E and 11G. As with the interconnection of shaft sections 60A and 60B, pulling slightly downward will seat the slots of middle shaft section 60D in the recesses 82 of the tabs 62 of top shaft section 60C, and also will seat the slots of bottom shaft section 60E in the recesses 82 of the tabs 62 of middle shaft section 60D.

It can be seen that a long series of straight and angled shaft sections can quickly and easily be interconnected using the tab and slot system described above and result in the adjacent edges of each pair of interconnected shafts to be positioned in parallel alignment.

Figure 10:
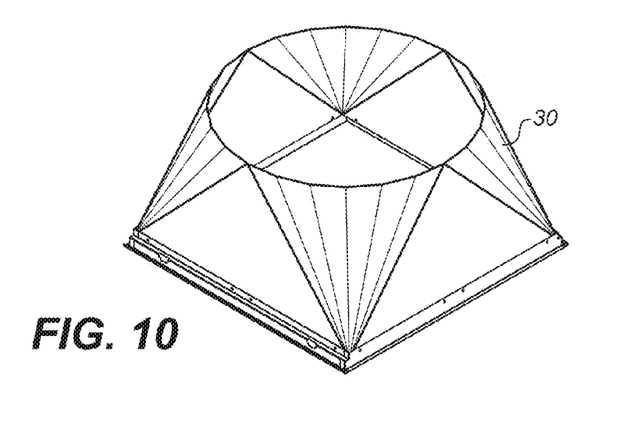
FIG. 10 is an upper perspective view of a round-to-square transition piece thereof.

With reference again to FIGS. 1 and 2, the lower angled shaft section 26 and lower straight shaft section 28 are connected using the tab and slot interconnection system described above. Finally, the round-to-square transition piece 30 shown in FIGS. 1, 2 and 10 is attached to the lower straight shaft section 28.

In another aspect of the invention, a hinging troffer bracket 32 is attached to the round-to-square transition piece and a ceiling diffuser (not shown) is secured to the troffer bracket 32 so that by swinging down troffer bracket 32 the ceiling diffuser is made accessible for ease of cleaning.

Figure 12:
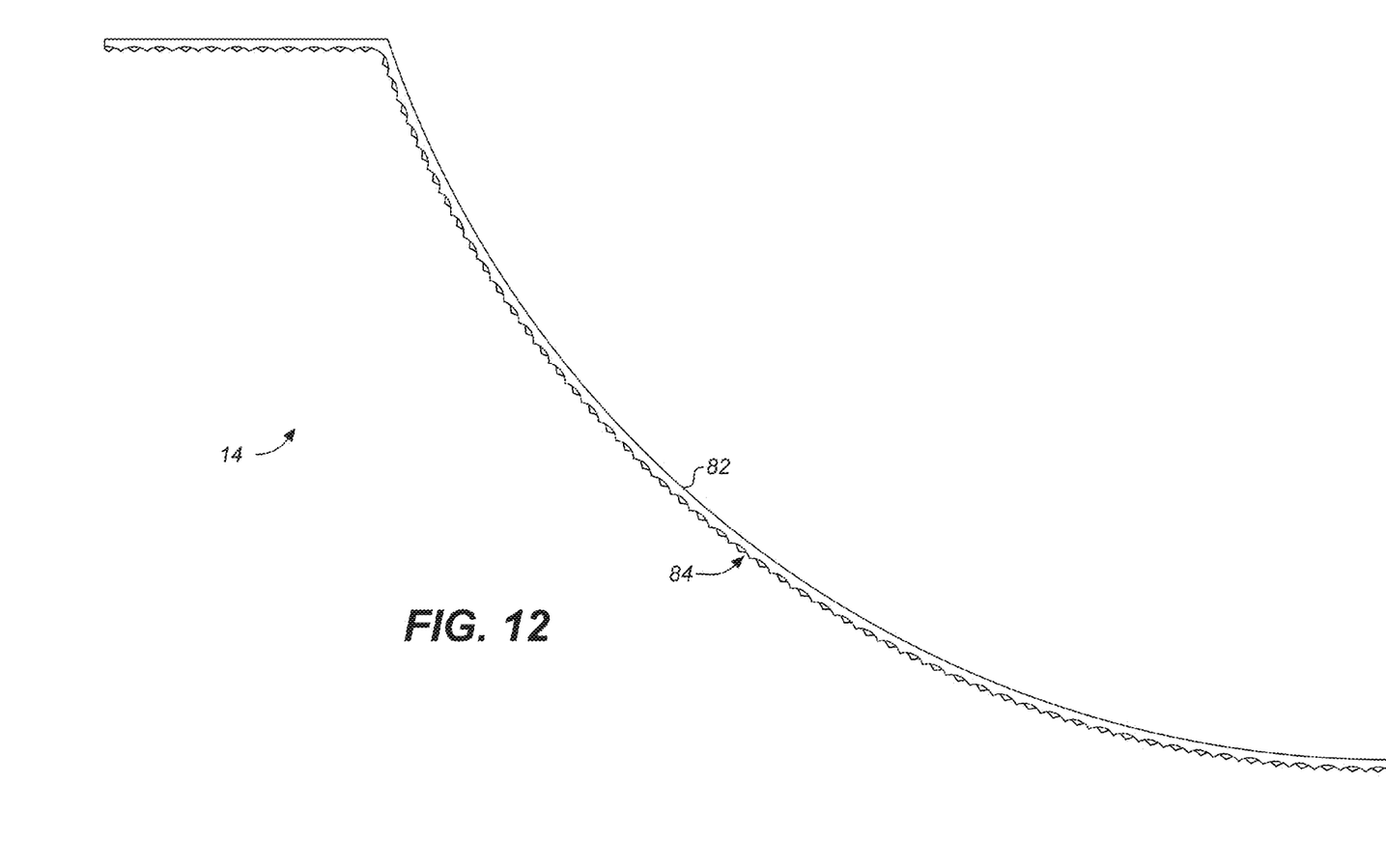
FIG. 12 is a side sectional view of the optic sphere of the improved tubular daylighting system shown in FIG. 1.

As shown in FIGS. 12 and 12A, the diffuser 14 comprises an inverted bubble-shaped dome 82 having a prismatic lower surface 84. Once the shaft construction has been assembled as described above, a diffuser 14 is mounted to and sealed on top of the square-to-round transition piece 16 such that the inverted dome 82 extends into the top opening 58 (see FIG. 2A) of the tubular shaft sections. The curved upper surface of the inverted dome 82 advantageously captures light cast from all angles to vertical which would otherwise be lost. The prismatic lower surface 84 of the diffuser 14 diffuses the light evenly into the tubular shaft sections thereby reducing brightness contrast of the light being emitted from the ceiling diffuser. This creates a more uniform and lower brightness across the diffuser while delivering the same lumens, eliminates unpleasant bright spots, and creates an aesthetically more pleasing appearance.

There have thus been described and illustrated certain preferred embodiments of an improved tubular daylighting system according to the invention. Although the present invention has been described and illustrated in detail, it should be clearly understood that the same is by way of example only and is not to be taken as limiting, the spirit and scope of the present invention being limited only by the terms of the appended claims and their legal equivalents.

I claim:

1. A tubular daylighting system for directing light from a skylight lens to a space within a building, the tubular daylighting system comprising:
   a plurality of tubular shaft sections including a top shaft section and a bottom shaft section, each of said plurality of shaft sections having a longitudinal center axis, said top shaft section for connecting to the skylight lens, said top shaft section having a different diameter than said bottom shaft section so that one of said top and bottom shaft sections can be inserted into the other in a nested configuration, said bottom shaft section having a shaft wall,
   said top shaft section having a plurality of sets of slots, each set of said plurality of sets of slots having one or more slots,
   said bottom shaft section having a plurality of arrays of tabs, each array of said plurality of arrays having one or more tabs, said plurality of arrays of tabs spaced equally around the circumference of said bottom shaft section, each said tab formed in and connected to the shaft wall of said bottom shaft section at a bend line parallel with said center axis such that said tabs are selectively bendable outwardly or inwardly relative to said shaft wall,
   in said nested configuration at least one of said one or more slots of each set of said plurality of sets of slots of said top shaft section registering with one of said one or more tabs of each of the arrays of said plurality of arrays of tabs of said bottom shaft section, such that bending the one or more tabs of one of said plurality of arrays of tabs through the one or more slots of one of said plurality of sets of slots securely interconnects said top and bottom shaft sections.

2. The tubular daylighting system of claim 1 wherein:
   each said tab when in a bent configuration is disposed in a plane parallel with the center axis of said bottom shaft section, and said tab has a neck extending from said bend line, a distal end having an axially-extending protrusion, and a recessed seating edge disposed on one edge of said neck between said bend line and said protrusion, and
   each of said slots of said plurality of sets of slots has lower edge,
   such that when said top and bottom shaft sections are interconnected, the recessed seating edge of at least one of the one or more tabs of one of said plurality of arrays of tabs is engaged with the lower edge of at least one slot of one of said plurality of sets of slots thereby capturing said lower edge between the shaft wall of said bottom shaft section and the protrusion of said tab.

3. The tubular daylighting system of claim 1 wherein:
   said top shaft section having a central axis and a bottom edge perpendicular to said central axis, said plurality of sets of slots longitudinally spaced from said bottom edge.

4. The tubular daylighting system of claim 1 wherein:
   said top shaft section has a bottom end and said plurality of sets of slots are disposed near said bottom end.

5. The tubular daylighting system of claim 4 wherein:
   said bottom shaft section has an upper end and said plurality of arrays of tabs are disposed near said upper end.

6. The tubular daylighting system of claim 1 further comprising:
   said plurality of tubular shaft sections having a top opening below the skylight lens, and
   a diffuser mounted to said plurality of tubular shaft sections at said top opening, said diffuser including an inverted dome extending into the top opening of said plurality of tubular shaft sections, said inverted dome having a prismatic lower surface, said diffuser for receiving light gathered by the skylight lens and transmitting it through said plurality of tubular shaft sections.

7. A tubular daylighting system for directing light from a skylight lens to a space within a building, the tubular daylighting system comprising:
   a plurality of tubular shaft sections including a top shaft section and a bottom shaft section, said top shaft section for connecting to the skylight lens, said top shaft section having a different diameter than said bottom shaft section so that one of said top and bottom shaft sections can be inserted into the other in a nested configuration,
   said top shaft section having a central axis and a plurality of sets of slots, each set of said plurality of sets of slots having one or more slots,
   said plurality of sets of slots being disposed in a common plane perpendicular to the central axis of said bottom shaft section,
   said bottom shaft section having a central axis, and a plurality of arrays of tabs equally spaced around the circumference of said top shaft section, each array of said plurality of arrays of tabs having one or more tabs, each said tab formed in the shaft wall of said bottom shaft section and selectively bendable outwardly or inwardly,
   said plurality of arrays of tabs having one or more rows of tabs, each said row of tabs having one or more tabs, each one of said rows in each of said arrays of tabs disposed in a common plane with one of the rows in each of the other arrays of tabs, said plane perpendicular to the central axis of said bottom shaft section, such that said top and bottom shafts are in coaxial alignment when interconnected, and
   in said nested configuration at least one of said one or more slots of each set of said plurality of sets of slots of said top shaft section registering with one of said one or more tabs of each of the arrays of said plurality of arrays of tabs of said bottom shaft section, such that bending said one or more tabs through said at least one slot in each of said plurality of sets of slots securely interconnects said top and bottom shaft sections.

8. The tubular daylighting system of claim 7 wherein:
   said one or more rows of each array of said plurality of arrays of tabs comprises three rows.

9. A tubular daylighting system for directing light from a skylight lens to a space within a building, the tubular daylighting system comprising:
   a plurality of tubular shaft sections including a top shaft section and a bottom shaft section, said top shaft section for connecting to the skylight lens, said top shaft section having a different diameter than said bottom shaft section so that one of said top and bottom shaft sections can be inserted into the other in a nested configuration, said top shaft section having a plurality of sets of slots, each set of said plurality of sets of slots having one or more slots, said bottom shaft section having a central axis and a plurality of arrays of tabs equally spaced around the circumference of said top shaft section, each array of said plurality of arrays of tabs having one or more tabs, each said tab formed in the shaft wall of said bottom shaft section and selectively bendable outwardly or inwardly, said plurality of arrays of tabs having one or more columns of tabs, each one of said columns of tabs having one or more tabs, each said column of tabs disposed in parallel alignment with said central axis, whereby in said nested configuration at least one of said one or more slots of each set of said plurality of sets of slots of said top shaft section registers with one of said one or more tabs of each of the arrays of said plurality of arrays of tabs of said bottom shaft section, such that bending said one or more tabs through said at least one slot in each of said plurality of sets of slots securely interconnects said top and bottom shaft sections.

10. The tubular daylighting system of claim 9 wherein:
said one or more columns of each array of said plurality of arrays of tabs comprises two columns.

11. A tubular daylighting system for directing light from a skylight lens to a space within a building, the tubular daylighting system comprising:

a plurality of tubular shaft sections including a top shaft section and a bottom shaft section, each of said plurality of shaft sections having a longitudinal center axis, said top shaft section for connecting to the skylight lens, said top shaft section having a different diameter than said bottom shaft section so that one of said top and bottom shaft sections can be inserted into the other in a nested configuration, said bottom shaft section having a shaft wall, said top shaft section having a plurality of sets of slots, each set of said plurality of sets of slots having one or more slots, each of said slots of said plurality of sets of slots having a lower edge, said bottom shaft section having a shaft wall and a plurality of arrays of tabs, said plurality of arrays of tabs equally spaced around the circumference of said bottom shaft section, each array of said plurality of arrays of tabs having one or more tabs, each said tab formed in and connected to the shaft wall of said bottom shaft section at a bend line parallel with said center axis such that said tabs are selectively bendable outwardly or inwardly from said shaft wall at a base line, each said tab having a neck and depending protrusion, said neck extending between said bend line and said depending protrusion defining a downwardly facing recessed seating edge between said shaft wall and said depending protrusion, in said nested configuration at least one of said one or more slots of each set of said plurality of sets of slots of said top shaft section registering with one of said one or more tabs of each of the arrays of said plurality of arrays of tabs of said bottom shaft section, such that bending the one or more tabs of one of said plurality of arrays of tabs through the one or more slots of one of said plurality of sets of slots securely interconnects said top and bottom shaft sections, and so that any downward movement of said bottom shaft section relative to said top shaft section captures the lower edge of each of said slots of said top shaft section between the shaft wall and the depending protrusion of one of said tabs of said bottom shaft section and causes the recessed seating edge of said tab to rest on said lower edge of one of said slots.

12. A tubular daylighting system for directing light from a skylight lens to a space within a building, the tubular daylighting system comprising:

a plurality of tubular shaft sections including a top shaft section and a bottom shaft section, said top shaft section having a different diameter than said bottom shaft section so that one of said top and bottom shaft sections can be inserted into the other in a nested configuration, each of said top and bottom shaft sections having a shaft wall, a central axis, a top end, and a plurality of arrays of tabs disposed near said top end, said plurality of arrays of tabs equally spaced around the circumference of each of said shaft sections, each array of said plurality of arrays of tabs having one or more rows of tabs, each said row of tabs having one or more tabs, each one of said rows in each of said arrays of tabs disposed in a common plane with one of the rows in each of the other arrays of tabs, said plane perpendicular to said central axis, each said tab formed in and connected to the shaft wall of said shaft section and selectively bendable outwardly or inwardly from said shaft wall at a bend line parallel with said center axis, each said tab having a neck and a depending protrusion, said neck extending between said bend line and said depending protrusion defining a recessed seating edge between said shaft wall and said depending protrusion, each of said top and bottom shaft sections also having a bottom end and a plurality of sets of slots disposed near said bottom end in a common plane perpendicular to said central axis, each set of said plurality of sets of slots having one or more slots, each of said slots of said plurality of sets of slots having a lower edge, in said nested configuration at least one of said one or more slots of each set of said plurality of sets of slots of said top shaft section registering with one of said one or more tabs of each of the arrays of said plurality of arrays of tabs of said bottom shaft section, such that bending one or more tabs of one of said plurality of arrays of tabs through one or more slots of one of said plurality of sets of slots securely interconnects said top and bottom shaft sections in coaxial alignment, and so that any downward movement of said bottom shaft section relative to said top shaft section captures the lower edge of each of said slots of said top shaft section between the shaft wall and the depending protrusion of one of said tabs of said bottom shaft section and causes the recessed seating edge of said tab to rest on said lower edge of one of said slots.

13. A tubular daylighting system for directing light from a skylight lens through a ceiling diffuser into a space within a building, the tubular daylighting system comprising:

a square curb piece incorporated into a roof structure, a transition plate mounted onto said curb piece, said transition plate having a square peripheral geometry, a central opening, and a plurality of tabs extending inwardly from said central opening, a plurality of tubular shaft sections for receiving the light emitted from the skylight, said plurality of tubular shaft sections having a light receiving top opening disposed below the skylight lens and an upper edge including a plurality of slots, said plurality of tabs inserted into said plurality of slots thereby suspending said plurality of tubular shaft sections from said transition plate, and a diffuser having an inverted dome extending into the top opening of said plurality of tubular shaft sections, said diffuser having a planar support flange extending from said inverted dome, said support flange disposed on said transition plate, said diffuser for receiving light gathered by the skylight lens and transmitting it through said plurality of tubular shaft sections to the ceiling diffuser.

14. The tubular daylighting system of claim 13 further comprising:

wherein said inverted dome has a prismatic lower surface for reducing brightness contrast of light emitted from the ceiling diffuser.

\* \* \* \* \*